United States Patent

Bauer et al.

Patent Number: 6,126,398
Date of Patent: Oct. 3, 2000

[54] TWO-PIECE ROTOR BLADE FOR A BEARINGLESS ROTOR OF A HELICOPTER

[75] Inventors: Karl Bauer; Gerald Kuntze-Fechner, both of Waakirchen, Germany

[73] Assignee: Eurocopter Deutschland GmbH, Donauwoerth, Germany

[21] Appl. No.: 09/321,337

[22] Filed: May 27, 1999

[30] Foreign Application Priority Data

May 28, 1998 [DE] Germany ............ 198 23 793
Apr. 1, 1999 [DE] Germany ............ 199 15 084

[51] Int. Cl.[7] .................................. B64C 27/50
[52] U.S. Cl. ............. 416/134 A; 416/143; 416/168 R; 416/230; 416/239
[58] Field of Search .................. 416/134 A, 140, 416/141, 142, 143, 106, 107, 168 R, 229 R, 230, 239, 241 A, 244 R, 244 D

[56] References Cited

U.S. PATENT DOCUMENTS

| 3,743,441 | 7/1973 | Ferris .......................... 416/143 |
| 4,244,677 | 1/1981 | Noehren et al. . |
| 4,427,340 | 1/1984 | Metzger et al. . |
| 4,676,720 | 6/1987 | Niwa et al. . |
| 4,690,616 | 9/1987 | Hahn et al. . |
| 4,746,272 | 5/1988 | Noehren et al. . |
| 4,892,461 | 1/1990 | Matsumoto et al. . |
| 4,898,515 | 2/1990 | Beno et al. . |
| 5,096,380 | 3/1992 | Byrnes et al. . |
| 5,263,821 | 11/1993 | Noehren et al. .......... 416/134 A |
| 5,372,479 | 12/1994 | Byrnes et al. . |
| 5,782,606 | 7/1998 | Mondet et al. .............. 416/142 |

FOREIGN PATENT DOCUMENTS

| 1531374 | 1/1970 | Germany . |
| 2927263 | 1/1980 | Germany . |
| 3526470 | 1/1987 | Germany . |
| 3707333 | 9/1988 | Germany . |
| 3734592 | 5/1989 | Germany . |

OTHER PUBLICATIONS

"The Bearingless Main Rotor", by Franklin D. Harris et al.; Proceedings of the European Rotorcraft and Powered Lift Aircraft Forum, France; Sep. 7–9, 1977, Paper No. 4; pp. 4–1 to 4–9.

*Primary Examiner*—Edward K. Look
*Assistant Examiner*—Liam McDowell
*Attorney, Agent, or Firm*—W. F. Fasse; W. G. Fasse

[57] ABSTRACT

A rotor blade for a bearingless rotor of a helicopter includes a lift-generating airfoil blade, a flexbeam connecting the airfoil blade to a rotor head, and a control sleeve enclosing the flexbeam. The junction between the flexbeam and the airfoil blade is a separable junction (J) to allow the airfoil blade to be folded in a simple manner while maintaining a high lead-lag stiffness and reduced structural height of the junction (J). The junction (J) is formed by two connection arms (5.1, 5.2) arranged side-by-side in the lead-lag plane ($E_R$) of the rotor blade (R). Preferably, the two connection arms extend from the inboard end of the airfoil blade (3) and receive the head (1.1) of the flexbeam (1) therebetween lying in the lead-lag plane ($E_R$). A connecting fixture (6) connects the connection arms (5.1, 5.2) to the flexbeam head (1.1) using fasteners such as bolts ($V_1$, $V_2$) that are spaced laterally from each other at a spacing distance of at least 1.3 times the maximum width of the torsionally flexible portion of the flexbeam.

22 Claims, 8 Drawing Sheets

TWO-PIECE ROTOR BLADE FOR A BEARINGLESS ROTOR OF A HELICOPTER

PRIORITY CLAIM

This application is based on and claims the priority under 35 U.S.C. §119 of German Patent Applications 198 23 793.6 filed on May 28, 1998, and 199 15 084.2 filed on Apr. 1, 1999, the entire disclosures of which are incorporated herein by reference.

1. Field of the Invention

The invention relates to a rotor blade for a bearingless rotor of a helicopter, including a lift-generating airfoil blade, a flexbeam enclosed by a control sleeve or torque tube, and a connection means forming a separable or releasable junction between the airfoil blade and the flexbeam.

2. Background Information

Present day rotor blades for helicopters are typically made of fiber reinforced composite materials. During operation, the rotor blades are deflected in various directions and are thereby subjected to high loads in these various directions. The rotor blades must be designed to withstand these high loads while still providing the required flexibility or articulation to allow the blades to carry out flapping, lead-lag oscillating, and pitch angle variation movements.

Typically, a rotor blade of a bearingless rotor includes a structural element known as a flexbeam at the inner end of the blade connected to the rotor head. The flexbeam supports and transmits the centrifugal forces of the blade into the rotor head. Additionally, the flexbeam includes at least portions or regions that are flexurally and torsionally soft or flexible to allow the blade to undergo the above mentioned movements in a flapping direction, a lead-lag direction, and in a pitch angle direction about the torsional axis. The torsionally soft portion of the flexbeam is arranged within a torsionally stiff control sleeve or torque tube, through which the pitch angle control movements are transmitted to the lift-generating airfoil blade portion of the rotor blade. In this context, the airfoil blade typically extends from the outboard end of the control sleeve to the outermost end of the rotor blade, i.e. the blade tip.

In order to achieve an adequate ground and air resonance stability, the vibrations or oscillations of the rotor blades, and particularly the oscillations in the lead-lag direction, must be damped by appropriate damping elements. Such damping elements are typically arranged generally in the area of the control sleeve and/or the flexbeam. The damping effectiveness of the damping elements in this context is predominantly dependent on the positive transmission and application of the lead-lag oscillating movements of the airfoil blade into the damping elements. Any softness or lack of positive force transmission through the damping geometry or kinematics to the damping element will reduce the total resulting damping effect. In bearingless rotors, the transmission of the lead-lag movements to the damping elements is typically carried out through the control sleeve, which is embodied in a flexurally stiff manner and is conventionally connected to the airfoil blade in a flexurally stiff manner as described above.

In order to allow the flexbeam and/or the airfoil blade to be separately manufactured and/or replaced in the event of damage or the like, or in order to allow the airfoil blade to be pivoted and folded relative to the flexbeam, it is desired to provide a separable or releasable junction between the flexbeam and the lift-generating airfoil blade. A rotor blade with such a separable or releasable junction is known as a two-piece rotor blade, and in effect has a modular construction which makes it possible to achieve the above mentioned advantages, in comparison to the one-piece rotor blade in which the airfoil blade is integrally or permanently connected to the flexbeam.

The separable or releasable junction is subject to high technical and mechanical demands, because it must reliably carry and transmit the substantially high centrifugal forces resulting during rotation of the rotor blade. Due to the structural arrangements of the prior art junctions, the fastening means such as bolts provided at the junction are generally arranged relatively close to each other with respect to the profile depth direction. In other words, the fastening means such as bolts typically have a spacing from one another that corresponds to at most 1.0 to 1.2 times the greatest width or breadth of the torsionally soft portion of the flexbeam as projected into the rotor blade plane. Such a close spacing of the fastening means disadvantageously provides a relatively short lever arm onto which all of the lead-lag moments are applied, and thereby suffers inadequate stiffness of the junction with respect to the lead-lag forces.

U.S. Pat. No. 5,096,380 (Byrnes et al.) discloses a flexbeam construction for a bearingless rotor including a junction between the flexbeam and the lift-generating airfoil blade. A relatively great number of bolts are provided as fastening means at the separable junction, whereby these bolts connect the control sleeve and the flexbeam with the airfoil blade in a lead-lag pivotally stiff manner. In this known arrangement, the required lead-lag pivotal stiffness or bending stiffness is achieved by means of the increased number of bolts securing the separable junction. When a blade folding operation is to be carried out, all of the bolts must be loosened and removed to allow the airfoil blade to be folded relative to the flexbeam. Similarly, in order to make the helicopter flight-ready when the blades are in a folded condition, the blades need to be re-positioned into the operating position and then all of the numerous bolts at each separable junction must again be inserted and tightened to a prescribed torque. Such a blade folding and reinstallation process is very complicated, time consuming, and subject to error.

U.S. Pat. No. 4,676,720 (Niwa et al.) discloses a rotor blade construction which uses only two bolts to secure a separable or releasable junction, whereby such a junction construction easily allows the blades to be folded. However, such a rotor blade construction includes a very expensive, complicated and high value damper arrangement, which aims to compensate for the kinematic losses that result from the reduced connection stiffness of the control sleeve provided by the minimal number of only two connector bolts. Moreover, the specific connection structure at the junction is very complicated and must be clamped together using expanding bolts and the like in order to achieve a sufficient connection stiffness. Therefore, the flexbeam head is slightly wider or broader than the torsionally soft portion of the flexbeam, in order to achieve an adequate lead-lag pivotal stiffness, because, of course, an adequate stiffness in this regard is an absolute necessity at the junction between the flexbeam and the airfoil blade. This slightly greater width of the flexbeam head has not been increased previously in the prior art, because it has always been considered that the centrifugal forces must be carried or transmitted along the direct effective line of the applied force.

U.S. Pat. No. 4,676,720 (see especially FIG. 6) demonstrates the typical characteristic configuration and features of the connection between a flexbeam head and a lift-generating airfoil blade. Namely, for the reasons described above, the inboard end of the airfoil blade forms a fork-shaped connection structure having a recess or gap between the two legs of the fork. These two legs of the fork are arranged one above the other in the vertical direction, particularly one above and one below the lead-lag pivoting plane of the blade, and allow a mating head end of the flexbeam to be inserted into the recess or gap between the two fork legs until butting against the end of the recess. Vertical holes are provided in registration through the flexbeam head and the fork legs, in order to receive connection means such as bolts extending therethrough. Such a connection or junction between the flexbeam head and the inboard end of the airfoil blade requires a relatively large total structural height, especially in view of the vertically overlapping arrangement of the flexbeam head between the two fork legs of the airfoil blade. This large structural height of the junction necessitates a rather high and thus aerodynamically disadvantageous configuration of the control sleeve.

SUMMARY OF THE INVENTION

In view of the above, it is an object of the invention to provide an improved configuration of a rotor blade for a bearingless rotor of a helicopter, and particularly to provide a separable or releasable junction between an airfoil blade and a flexbeam to allow the quickest and easiest possible folding of the rotor blade, while improving the lead-lag pivotal stiffness of the connection at the junction and reducing the total structural height of the junction area in order to reduce air resistance, in comparison to the prior art. It is a further object of the invention to achieve an especially simple and economical junction arrangement for a two-piece rotor blade. The invention further aims to avoid or overcome the other disadvantages of the prior art, and to achieve additional advantages, as apparent from the present specification.

The above objects have been achieved in a rotor blade arrangement for a bearingless rotor of a helicopter according to the invention, including a lift-generating airfoil blade, a flexbeam, a control sleeve enclosing the flexbeam, and a connection arrangement providing a separable or releasable junction between the lift-generating airfoil blade and the flexbeam. Particularly according to the invention, the connection arrangement includes two connection arms that are both arranged lying in or on the lead-lag pivoting plane of the rotor blade. In this context, the lead-lag pivoting plane essentially corresponds to the rotation plane of the rotor blade.

The invention applies equally to a first embodiment in which the connection arms form a part of or are connected to the head of the flexbeam, and a second embodiment in which the connection arms are connected to or form a part of the inboard end of the airfoil blade. Preferably, the connection arms are permanently connected to or extend from the inboard end of the airfoil blade. The two connection arms are particularly arranged in the lead-lag plane on two opposite sides next to the flexbeam head. Advantageously, the two connection arms extend at an angle relative to each other so as to form a V-shape.

The connection arms and the flexbeam head together are received in a connecting fixture. Moreover, fastening means such as bolts, screws, rivets, pins or the like are used to secure the connection arms and the flexbeam head to the connecting fixture. As an advantageous alternative, the flexbeam head itself is embodied as a connecting fixture which is adapted to receive the connecting arms secured thereto, whereby it is possible to avoid the need of a separate fixture component. As examples, the fixture can be made of metal or of fiber-reinforced composite material. The holes provided in the connection arms for receiving the fastening means such as bolts or the like are spaced apart from each other so that the fastening means are laterally spaced from each other in the lead-lag plane by a distance that is at least a 1.3-fold multiple of the greatest width of the torsionally soft portion of the flexbeam as projected into the lead-lag plane (essentially corresponding to the rotor blade plane). The inventive arrangement achieves the advantage that the lead-lag pivoting stiffness of the connection provided at the separable or releasable junction is substantially increased although only two bolts or other fastening means are required. In comparison to prior art arrangements, it is simultaneously possible according to the invention to substantially reduce the total structural height of the junction without detracting from the mechanical strength of the junction. Thereby, it is possible to configure the control sleeve with a reduced profile height and therewith an improved overall aerodynamic configuration.

The connecting fixture also takes up and transmits the centrifugal forces in such a manner so as to achieve a redirection of the transmission of the centrifugal force out of the direct line of the net effective force. In this context, the connecting fixture is dimensioned and engineered to have adequate strength for achieving this positive force transmission. In an alternative embodiment, the inner wall of the outboard end of the control sleeve itself is configured and embodied as a connecting fixture. In this manner, the need of a separate or independent fixture is avoided. In any case, the fixture is provided with throughholes for receiving the fastening means such as bolts, pins, rivets or the like.

With the arrangement of the connection or junction according to the invention, it is possible to pivot the lift-generating airfoil blade portion of the rotor blade relative to the flexbeam and the control sleeve in the lead-lag plane for the purpose of folding the blade into a folded configuration, in a very quick and simple manner. Namely, it is simply necessary to loosen and remove a single one of the fastening means, such as a bolt, in order to allow the blade to be pivoted about the other remaining bolt to achieve the desired blade folding. Since the connecting fixture is symmetrical or substantially symmetrical in a particular embodiment of the invention, it is possible to carry out the blade folding operation by pivoting the blade about either one of the two fastening means as desired.

DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
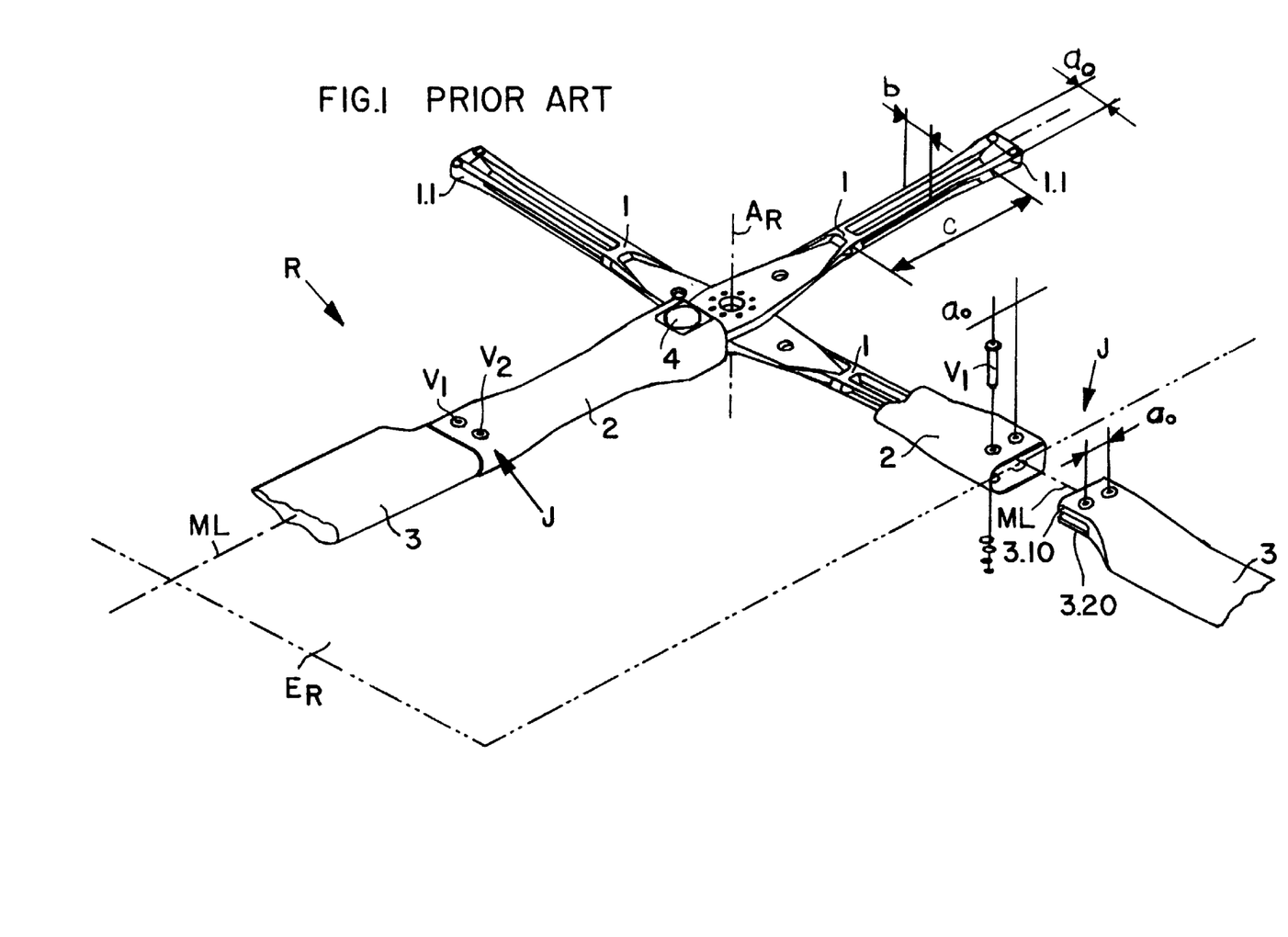
FIG. 1 is a perspective view of a portion of a rotor arrangement having two-piece rotor blades with a separable junction according to the prior art.

FIG. 1 shows a prior art arrangement of a rotor blade R for a bearingless rotor of a helicopter, in a schematic manner with portions of the rotor broken away for the sake of illustration. The known rotor blade R comprises a flexbeam 1 as well as a lift-generating airfoil blade 3, and a torsionally stiff control sleeve or torque tube 2 enclosing the flexbeam 1. The flexbeam 1 consists of a fiber-reinforced composite material. The root end of the flexbeam 1 is secured to the rotor head of the helicopter (not shown). When the rotor head rotates, each of the rotor blades R rotates about the rotor axis $A_R$, whereby the rotor blades R rotate in a rotor blade plane $E_R$. This rotor blade plane $E_R$ substantially corresponds to the lead-lag pivoting or oscillating plane of the rotor blades, so that this lead-lag plane is also designated with the reference character $E_R$. The lengthwise central axis ML of a rotor blade R essentially lies in this lead-lag plane $E_R$.

Each rotor blade R has a separable or releasable junction J between the flexbeam 1 and the airfoil blade 3. Thus, each rotor blade R has a two-piece construction. The inboard or root end of the airfoil blade 3 has two fork arms 3.10 and 3.20 extending therefrom as connection means to form the junction J. The out-board end of the flexbeam 1 includes a flexbeam head 1.1 that is received in a gap or recess between the two connection arms 3.10 and 3.20 of the airfoil blade 3. In this arrangement, the connection arms 3.10 and 3.20 of the blade 3 are positioned above and below the lead-lag plane $E_R$, with the flexbeam head received therebetween.

In order to fasten or secure the lift-generating airfoil blade 3 to the flexbeam 1, as well as to the control sleeve 2, two fasteners such as bolts $V_1$ and $V_2$ are secured through respective aligned holes provided in the outboard end of the flexbeam head 1.1 and the outboard end of the control sleeve 2, as well as the inboard end of the airfoil blade 3 forming the arms 3.10 and 3.20. Throughout this specification, the term "inboard" refers to a direction toward the rotor head while the term "outboard" refers to a direction away from the rotor head.

The fasteners such as bolts $V_1$ and $V_2$ are spaced at a relatively small distance $a_0$ from each other, which corresponds to at most 1.0 to 1.2 times the width or breadth b of the torsionally soft portion of the flexbeam 1. Due to the relatively small spacing $a_0$ between the bolts $V_1$ and $V_2$, the connection arrangement has a relatively small connection lever arm effective against the moment of the lead-lag oscillations of the airfoil blade 3 in the lead-lag plane $E_R$. Thus, for reasons of sufficient stiffness in the junction J, the connection between the flexbeam 1 and the airfoil blade 3 must be constructed with a relatively high structural height. As a result, the rotor blade R is relatively thick or high in its aerodynamic profile at the area of the junction J, which has direct aerodynamic disadvantages. In this context, the structural height of the junction J corresponds to the height perpendicular to the lead-lag plane $E_R$, whereby the lengthwise central axis ML of the rotor blade R lies in this plane $E_R$ and the pertinent height is measured from this plane to the upper limit or boundary of the blade connection arrangement, i.e. the upper surface of the upper connecting arm 3.10.

In view of the relatively low stiffness of the resulting junction J, there are kinematic losses in the force transmission of the lead-lag oscillations of the airfoil blade 3 into the flexbeam 1 and control sleeve 2. For this reason, it is necessary to provide relatively expensive high-grade damping means 4 at the inboard end of the control sleeve 2 as shown in FIG. 1, in order to compensate for the kinematic losses of the junction.

Figure 2:
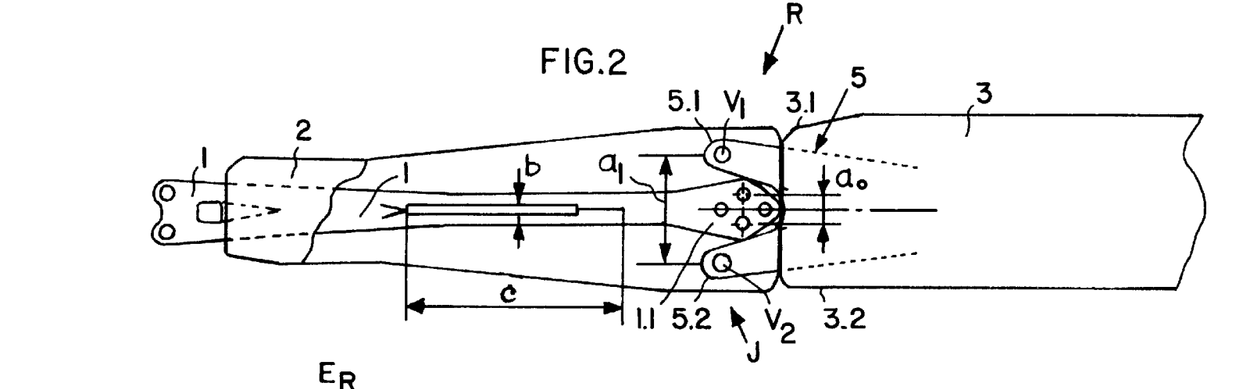
FIG. 2 is a schematic top plan view of a portion of a two-piece rotor blade having a separable junction including connection arms protruding from the inboard end of the airfoil blade, according to the invention.

FIG. 2 schematically shows an embodiment of a separable or releasable junction J of a two-piece rotor blade R according to the invention. The rotor blade R is lying in the plane of the drawing figure, which corresponds to the lead-lag plane $E_R$. The rotor blade R according to the invention includes a flexbeam 1, a control sleeve 2, and an airfoil blade 3 which may generally correspond to any such components known in the prior art. However, additional advantages in the configuration of these components are achieved by using the particular junction J arrangements according to the invention, as described herein. The junction J serves the purpose of interconnecting the modular individual components, i.e. the flexbeam, the airfoil blade, and the control sleeve, with each other, and also transmitting the arising forces through the junction J. The dimensioning and other engineering considerations such as choice of material of the junction arrangement are predominantly determined by the loads that arise during rotation of the rotor blade and also the loads that arise in the folded condition of the rotor blade.

As shown in FIG. 2, the junction J comprises connection members 5 that are especially configured as two attachment branches or connection arms 5.1 and 5.2 that form a double-arm connection or so-called "dual branch attachment" of the airfoil blade 3 to the flexbeam 1 and to the control sleeve 2. The connection arms 5.1 and 5.2 are arranged laterally next to each other in the lead-lag plane $E_R$ of the rotor blade R, whereby the arms 5.1 and 5.2 respectively extend laterally along the sides of the flexbeam 1, i.e. with the flexbeam head 1.1 received between the two arms 5.1 and 5.2 in the lead-lag plane $E_R$. Advantageously, the connection arms 5.1 and 5.2 are arranged within the control sleeve 2. These connection arms 5.1 and 5.2 take-up the effective forces and transmit these forces through the junction J.

The junction J may also include a sleeve or a seal boot arranged to surround and enclose both connection arms 5.1 and 5.2, but such a sleeve or seal boot does not change anything in the basic structure and operation of the junction formed by the two connection arms. The particular configuration of the connection arms can be embodied in many different ways. The arms are preferably made of a fiber reinforced composite material that is rigidly connected to or integrally extends from the body of the airfoil blade 3, that may also be made of a fiber-reinforced composite material.

As described above, a recess or space between the two connection arms 5.1 and 5.2 receives and positions the flexbeam head 1.1 therein. Preferably, the two connection arms 5.1 and 5.2 extend at a V-shaped angle therebetween, so as to thereby form the recess for receiving the flexbeam head 1.1. The actual connection between the flexbeam head 1.1 and the connection arms 5.1 and 5.2 is achieved by means of a connecting fixture 6, which exactly positions the components relative to each other and achieves a connection that is stiff against bending in the lead-lag direction yet releasable or separable by using simple fasteners such as bolts, pins, rivets or the like. An additional advantage provided by such a connecting fixture is that it makes it possible to realize a novel damping concept, in which the damping elements are also secured to the connecting fixture.

With the present inventive arrangement, in which the connection arms 5.1 and 5.2 are positioned laterally relative to the flexbeam head 1.1, and provide an interconnection with the above mentioned connecting fixture, it has been achieved that the fasteners $V_1$ and $V_2$ such as bolts or the like are spaced apart from each other at a lateral spacing distance $a_1$ that is greater than a 1.2-fold multiple of the width or breadth b of the torsionally soft portion c of the flexbeam 1 as projected onto the lead-lag plane $E_R$. This is in contrast to the above described prior art arrangements in which the spacing $a_0$ between the fasteners was at most 1.2 times the width b. For the sake of easy comparison, the width $a_0$ is also shown in FIG. 2. Preferably, and advantageously, the lateral spacing $a_1$ between the fasteners $V_1$ and $V_2$ in the inventive arrangement is at least 1.3, or even at least 1.4, or especially even 1.5 times the width or breadth b of the torsionally soft portion or region c of the flexbeam 1 as projected onto the lead-lag plane $E_R$. This lateral spacing $a_1$ is measured in the lead-lag plane $E_R$ perpendicularly to the lengthwise central axis of the rotor blade.

Due to the achieved increased spacing $a_1$ between the two fasteners such as bolts $V_1$ and $V_2$, the present arrangement achieves a connection of the airfoil blade 3 to the control sleeve 2 and the flexbeam 1 that is very stiff against bending in the lead-lag direction. A very high lead-lag stiffness through the junction J is especially achieved when the two fasteners $V_1$ and $V_2$ are positioned with the maximum possible spacing therebetween. The maximum possible spacing between the two fasteners $V_1$ and $V_2$, i.e. the maximum possible value of the lateral spacing $a_1$, is achieved when this lateral spacing approaches the total profile depth or chord length of the airfoil blade 3 adjacent to the junction J, for example a lateral spacing $a_1$ of at least 80% or even 90% of the chord length. In this context, the chord length or profile depth of the airfoil blade 3 at the junction J corresponds to the shortest spacing between the leading edge boundary 3.2 and the trailing edge boundary 3.1 of the airfoil blade 3 adjoining the junction J.

According to the example embodiment of FIG. 2, it is possible to selectively use a separate connecting fixture 6 or 6.3, or an integral connecting fixture 6.1 integrated into the end of the control sleeve 2, as will be described below. Namely, the embodiment of FIG. 2 shows the flexbeam head 1.1 having a configuration fitting entirely into the space between the two connection arms 5.1 and 5.2. However, according to another example embodiment, the flexbeam head 1.1 itself can be embodied to include an integral connecting fixture 6.2 protruding therefrom. Such an embodiment will be described below with regard to FIG. 5.

Figure 2A:
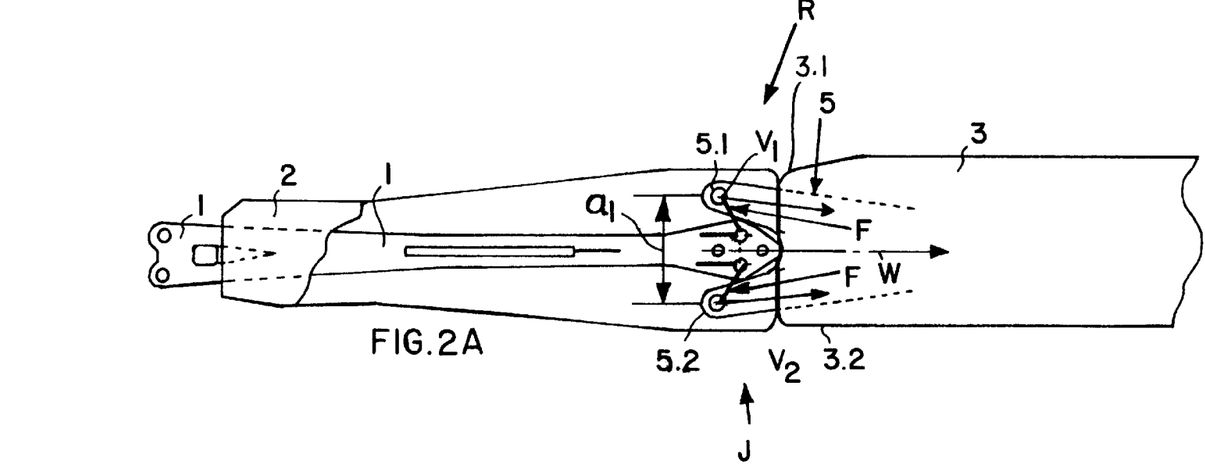
FIG. 2A generally corresponds to the view of FIG. 2, and further illustrates the lines of force transmission of the centrifugal force through the junction.

With the use of any such connecting fixture, the lateral spacing $a_1$ between the two fasteners $V_1$ and $V_2$ is fixed or permanently and rigidly established. In other words, after releasing and separating the junction and then again re-connecting the junction, the lateral spacing $a_1$ will always remain the same. Moreover, the provision of such a lateral spacing $a_1$ achieves a considerably increased lead-lag stiffness as mentioned above. That is particularly achieved because the inventive arrangement provides a considerable re-direction of the effective lines of force F by transmitting the centrifugal force out of or away from the center line or overall effective line of centrifugal force application in the rotor blade and particularly the airfoil blade portion 3. This situation is schematically illustrated in FIG. 2A. Namely, the effective lines of force transmission F are relatively wide set with respect to each other through the junction J, in view of the lateral spacing $a_1$ between the fasteners $V_1$ and $V_2$, which provide offsetting lever arms for force transmission between the narrower flexbeam and the wider set connection arms 5.1 and 5.2 of the present connection arrangement.

Figure 2B:
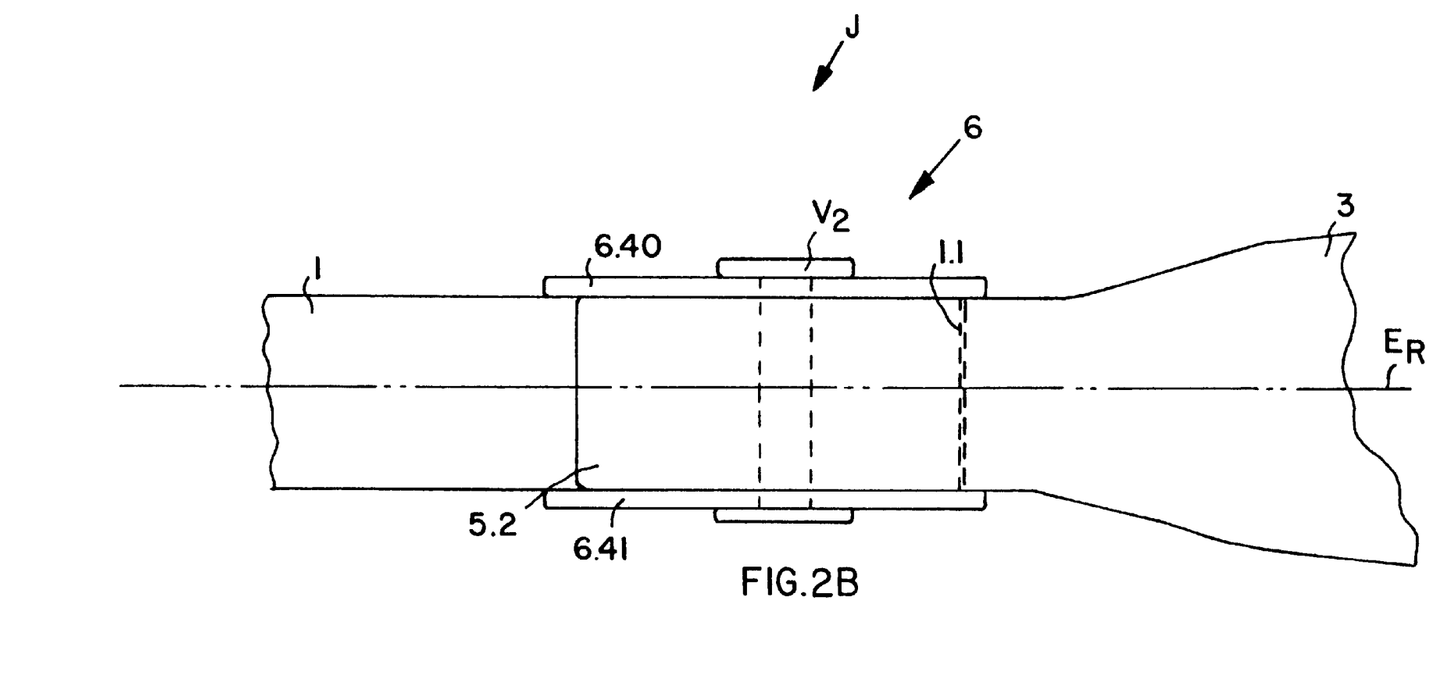
FIG. 2B is a schematic side view showing a detail portion of the inventive junction especially including the inventive connection arms.

FIG. 2B schematically shows a side view of the junction J between the flexbeam 1 and the lift-generating airfoil blade 3. In this side view, especially in connection with the top view of FIG. 2, it becomes apparent that the flexbeam head 1.1 is received laterally between, and not vertically between, the two connection arms. In the side view of FIG. 2B, the connection arm 5.2 is visible, while the connection arm 5.1 is hidden from view behind the flexbeam head 1.1, which in turn is mostly hidden from direct view behind the connection arm 5.2. The position of the flexbeam head 1.1 is schematically illustrated by a dashed line showing the outermost end or tip of the flexbeam head 1.1 butting against the recess or gap between the two connection arms 5.1 and 5.2. It is further clearly apparent that the connection arms 5.1 and 5.2 as well as the flexbeam head 1.1 all lie directly in the lead-lag plane $E_R$. With this arrangement, the vertical structural height of the junction J is significantly reduced in comparison to arrangements in which the connection arms or legs are arranged vertically one above the other with the flexbeam head therebetween.

FIG. 2B also shows that the connection is completed via a connecting fixture 6 that includes an upper fixture plate 6.40 and a lower fixture plate 6.41 which receive the connecting arms 5.1 and 5.2 as well as the flexbeam head 1.1 therebetween. The plates 6.40 and 6.41 of the fixture 6 are provided with bored holes coinciding with corresponding holes in the flexbeam head 1.1 and the connection arms 5.1 and 5.2, for receiving fasteners such as bolts $V_1$ and $V_2$ through these holes for fixing and securing the flexbeam head and the connection arms between the two fixture plates 6.40 and 6.41. The particular configuration of an embodiment of the fixture 6 will be described in detail below with reference to FIG. 6A.

Figure 3:
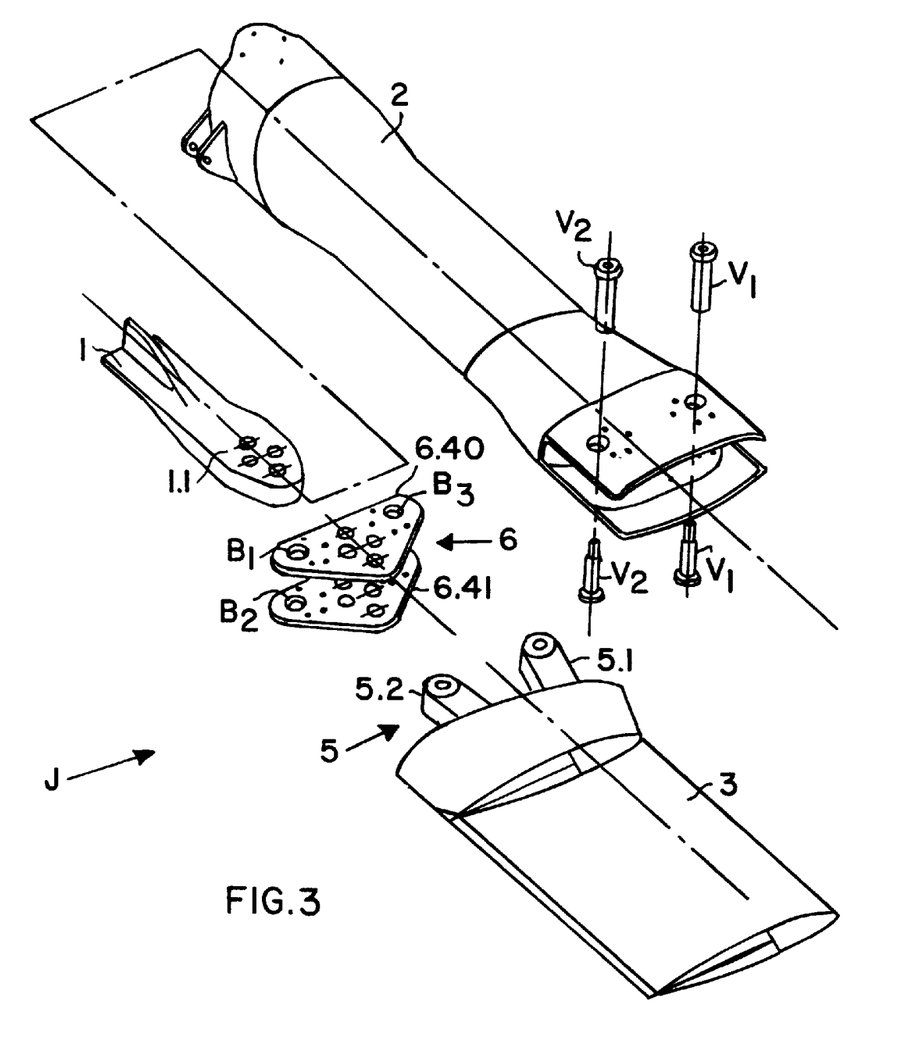
FIG. 3 is an exploded view of the components including a connecting fixture making up the junction.

FIG. 3 is a schematic exploded view of the components making up the junction J of a rotor blade R, using a separate connecting fixture 6. Merely a portion of the flexbeam beam 1 including the flexbeam head 1.1 is shown, whereby the flexbeam 1 is enclosed by the control sleeve 2. The outboard end of the control sleeve 2 extending toward the junction J is embodied in the configuration of a beak or duckbill including upper and lower extending sleeve portions with an opening or gap therebetween. The upper and lower extending sleeve portions are provided with throughholes for receiving the fasteners such as bolts $V_1$ and $V_2$ therethrough.

In the assembled condition, the flexbeam head 1.1 is positioned between the upper and lower extending sleeve portions of the beak or duckbill shaped end of the control sleeve 2. The flexbeam head 1.1 also has holes therein for being secured to the connecting fixture 6 using separate fasteners or securing means such as additional screws or bolts. In this embodiment, the fixture 6 comprises (or even consists of) two similarly configured and perfectly overlapping fixture plates 6.40 and 6.41, whereby the top fixture plate 6.40 is secured to the top of the flexbeam head 1.1 while the bottom fixture plate 6.41 is secured to the bottom of the flexbeam head 1.1. The two connection arms 5.1 and 5.2 extending in a V-shape from the airfoil blade 3 are also positioned between the top and bottom fixture plates 6.40 and 6.41 of the fixture 6 at positions laterally alongside the flexbeam head 1.1. Each one of the connection arms is provided with a respective hole at an end thereof, so as to align with holes provided in the fixture plate 6.40 and 6.41 for receiving the fasteners $V_1$, and $V_2$ therein.

As an example, the fastener $V_2$ is received through two holes $B_1$ and $B_2$ respectively provided in the fixture plates 6.40 and 6.41 and through the hole provided in the end of the connection arm 5.2, while a similar fastening configuration pertains for the connection arm 5.1. The fasteners $V_1$ and $V_2$ are further secured through corresponding holes provided in duckbill sleeve portions of the end of the control sleeve 2, as shown in FIG. 3. The lateral spacing $a_1$ between the fasteners $V_1$ and $V_2$ is fixed by the spacing between the holes $B_1$ and $B_3$ provided in the connecting fixture 6, and corresponds to the lateral spacing between the holes provided in the ends of the connection arms 5.1 and 5.2.

Figure 4:
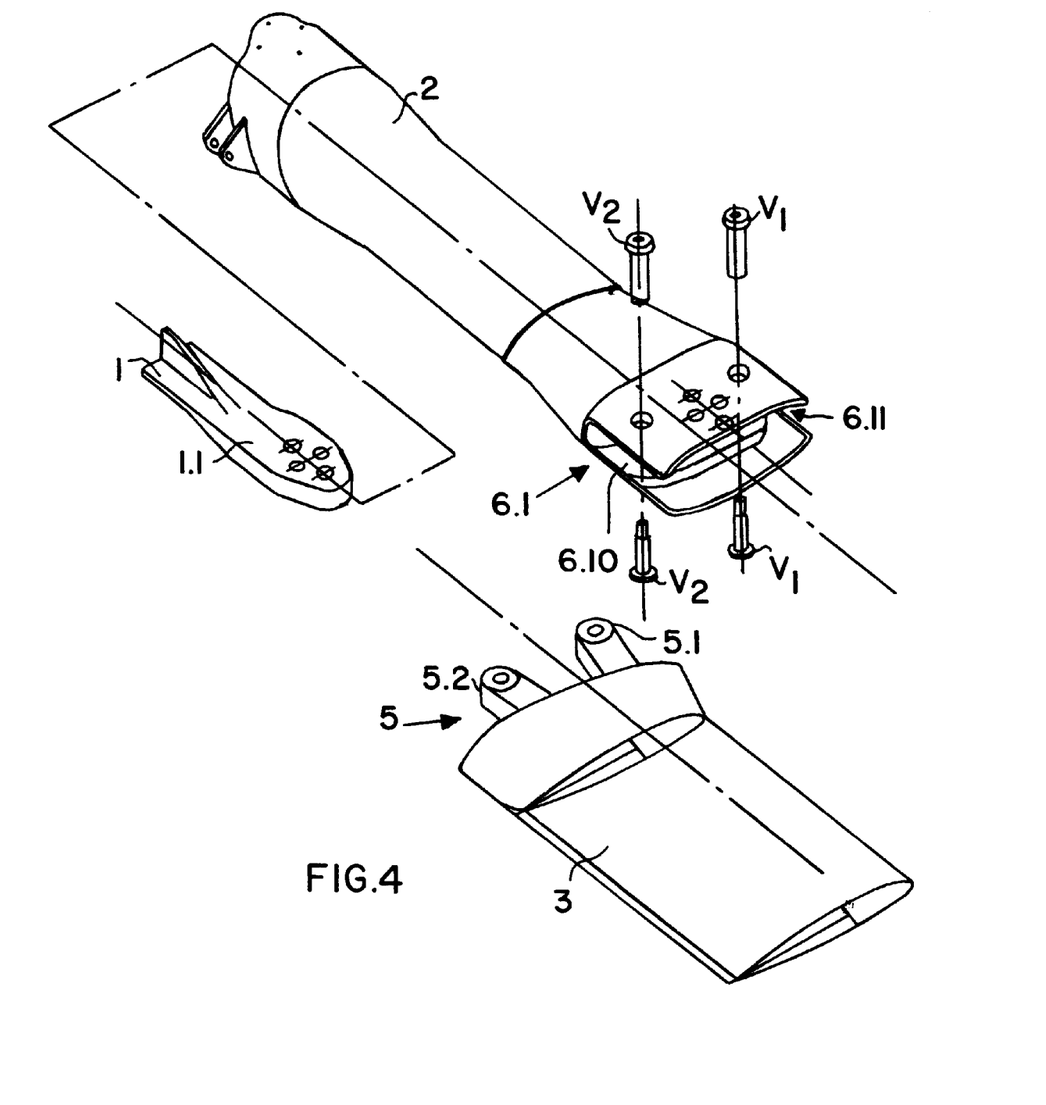
FIG. 4 is an exploded view of an alternative embodiment including a control sleeve having an integrated connecting fixture.

FIG. 4 schematically shows a further variation in which a connecting fixture 6.1 is integrated directly into the end of the control sleeve 2. Specifically, the fixture 6.1 is formed by two fixture plates 6.10 and 6.11 that have the same configuration and are arranged perfectly overlapping each other, one above the other. These fixture plates 6.10 and 6.11 are respectively arranged opposite one another on the two extending sleeve portions of the beak or duckbill shaped end of the control sleeve 2. The fixture plates 6.10 and 6.11 can be integrally formed with the extending sleeve portions of the control sleeve 2, or permanently connected thereto, for example by adhesive bonding or the like. The remainder of the arrangement according to FIG. 4, including the configuration and positioning of the flexbeam head 1.1 as well as the connection arms 5.1 and 5.2 forming the connection means 5, corresponds to that described above in connection with FIG. 3, for example.

Figure 5:
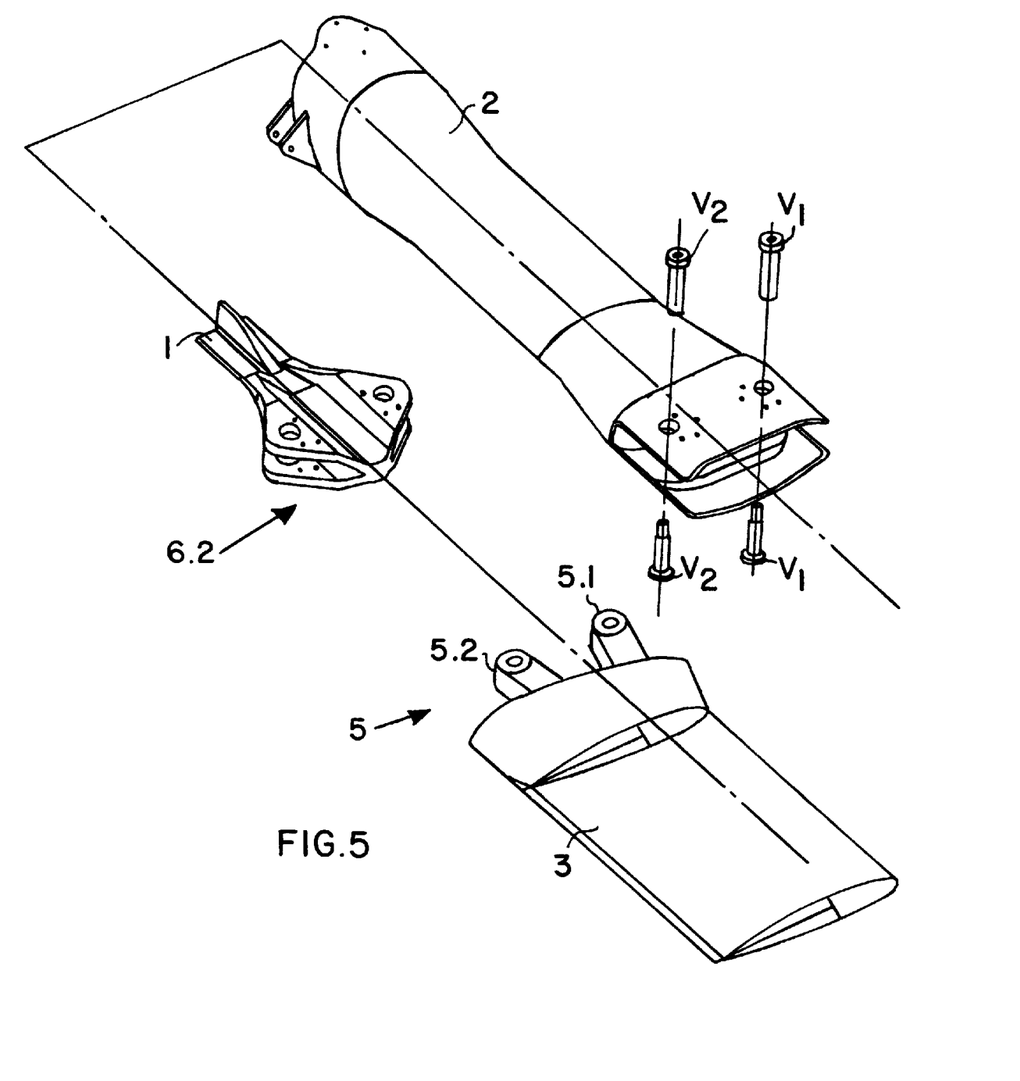
FIG. 5 is an exploded view of a further alternative embodiment in which the flexbeam head includes an integrated connecting fixture.

FIG. 5 shows an exploded view of a further variant in which the flexbeam head of a flexbeam 1 itself is integrally embodied to include a connecting fixture 6.2 protruding therefrom. In other words, the fiber-reinforced composite material of the flexbeam 1 is integrally formed as a connecting fixture 6.2 forming or protruding from the flexbeam head, or a comparable fixture is permanently connected to the remainder of the body of the flexbeam 1. The rest of the configuration and assembly of the components in the present embodiment corresponds to the above described embodiments. Namely, the connection arms 5.1 and 5.2 are received between protruding flange portions of the connecting fixture 6.2, with the core portion or major body portion of the flexbeam 1 terminating in a flexbeam head is received between the two connecting arms 5.1 and 5.2 in the lead-lag plane. The fasteners $V_1$ and $V_2$ connect the connecting arms 5.1 and 5.2 to the integral connecting fixture 6.2 through corresponding holes provided therein, at a lateral spacing of the above mentioned spacing distance $a_1$.

Figure 6:
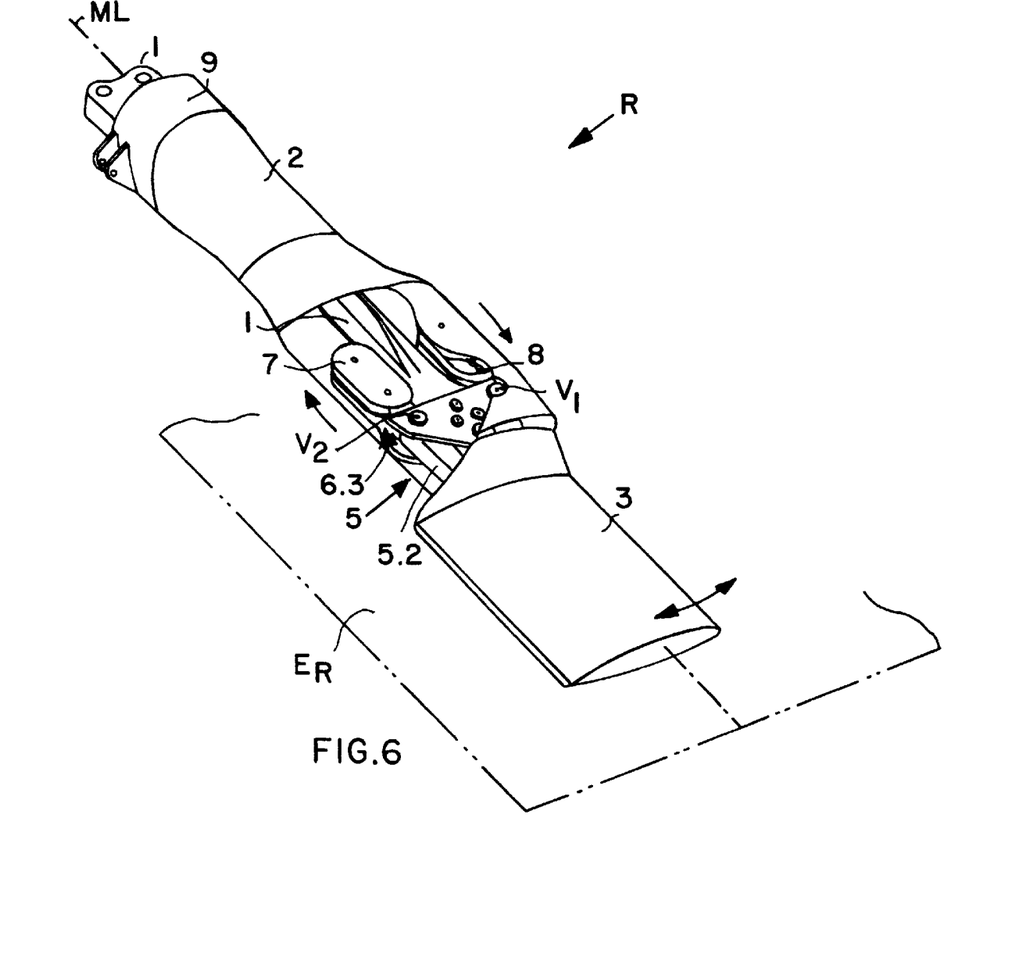
FIG. 6 is a partially broken open schematic perspective view showing the completely assembled junction of a rotor blade for a bearingless rotor according to the invention.

In the above described Figures, the arrangement of damping means was omitted for the sake of clarity and simplicity. It should be understood that any known configuration and arrangement of damping means can be used in connection with a two-piece rotor blade having a junction J according to the present invention. For example, the conventional damping means 4 arranged at the inboard end of the control sleeve 2, as generally indicated in FIG. 1 and discussed above, can be used in connection with the inventive arrangements at the outboard end of the control sleeve 2 as shown in FIGS. 2 through 5. However, a preferred arrangement of damping means in connection with the present junction J arrangement is shown in FIG. 6. Specifically, the rotor blade R once again lies in the lead-lag plane $E_R$. A connecting fixture 6.3 is secured to the head of the flexbeam 1, whereby the fixture 6.3 and flexbeam 1 are substantially enclosed by the control sleeve 2, which is shown partially broken open for the sake of illustration. It can also be seen in FIG. 6 that a fastener such as a bolt $V_2$ fastens or secures the connection arm 5.2 of the connection means 5 of blade 3 releasably or removably to the connecting fixture 6.3. A similar connection of the connecting arm 5.1 pertains as well, but is not directly visible in FIG. 6.

FIG. 6 further shows a novel damper arrangement including two damping elements 7 and 8 secured directly to the connecting fixture 6.3 and secured to the outboard end of the control sleeve 2. This arrangement of the damping elements 7 and 8 provides a damping connection between the outboard end of the control sleeve 2 and the connecting fixture 6.3, and then further the fixture 6.3 to the flexbeam 1 and the airfoil blade 3. The outer end of the control sleeve 2 is only connected to the damping elements 7 and 8, and is not otherwise directly connected to the fixture 6.3 or the arms 5.1 and 5.2, as apparent from the gap between the sleeve 2 and the blade 3 shown in FIG. 6, so as to allow the damped lead-lag motion between the sleeve 2 and the blade 3 as indicated by the motion arrows in FIG. 6. The inboard end of the control sleeve 2 is connected to or supported relative to the inboard end of the flexbeam 1 by a control sleeve support brace 9 cooperating with a support bearing. In this arrangement, the damping elements 7 and 8 lie substantially in the lead-lag plane $E_R$ (or in pairs symmetrically above and below the lead-lag plane $E_R$) laterally on both sides of the flexbeam 1, within the control sleeve 2.

such a connection including damping elements 7 and 8 provides an improved damping effect and simplified damping arrangement, in combination with the present junction J that achieves a considerably improved lead-lag stiffness as a result of the arrangement of laterally spaced connection arms lying directly in the lead-lag plane. This separable junction J provides a very rapid and simple possibility of folding the rotor blades, whereby advantageously only two fasteners such as bolts are needed for securely holding the airfoil blade. As an overall result of the inventive arrangement, the structural height of the junction may be drastically reduced, which achieves the considerable advantage of making the control sleeve more aerodynamically configured in the area of the junction.

Figure 6A:
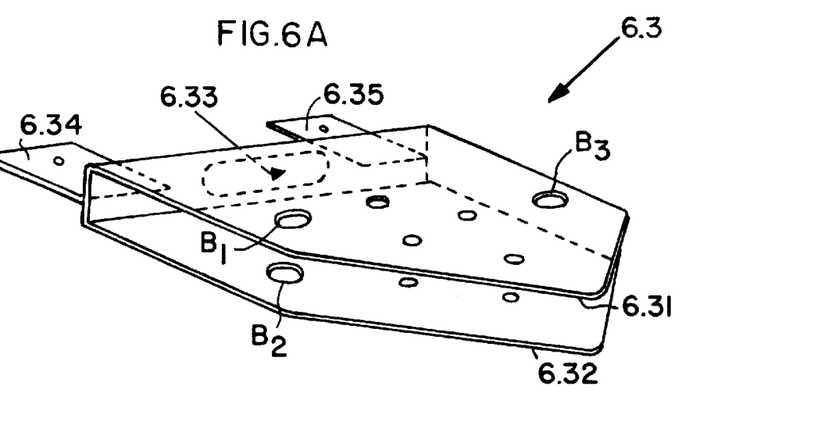
FIG. 6A is a schematic perspective view of a connecting fixture for use in the embodiment according to FIG. 6.

FIG. 6A schematically shows a connection fixture 6.3 for use in the embodiment of FIG. 6. The fixture 6.3 is substantially U-shaped in plan, and includes two plates 6.31 and 6.32 forming the body of the fixture 6.3 at the saddle of the U-shape. Specifically, a connecting wall or web interconnects the two plates 6.31 and 6.32 along the saddle of the U-shape, whereby an elongated hole 6.33 is provided through this connecting wall in the saddle of the U-shape to allow the flexbeam head 1.1 to be inserted through this elongated hole 6.33 and positioned between the two plates 6.31 and 6.32. Two respective shanks 6.34 and 6.35 extend from the s addle in a direction opposite from the plates 6.31 and 6.32 to complete the U-shape. The damping elements 7 and 8 can be directly secured on these two shanks or legs

6.34 and 6.35, whereby the damping elements 7 and 8 preferably each comprise elastomeric layers secured to the shank 6.34 or 6.35. These damping elements damp the lead-lag oscillating movements of the rotor blade R in the lead-lag plane $E_R$ when used in the arrangement according to FIG. 6.

Figure 7:
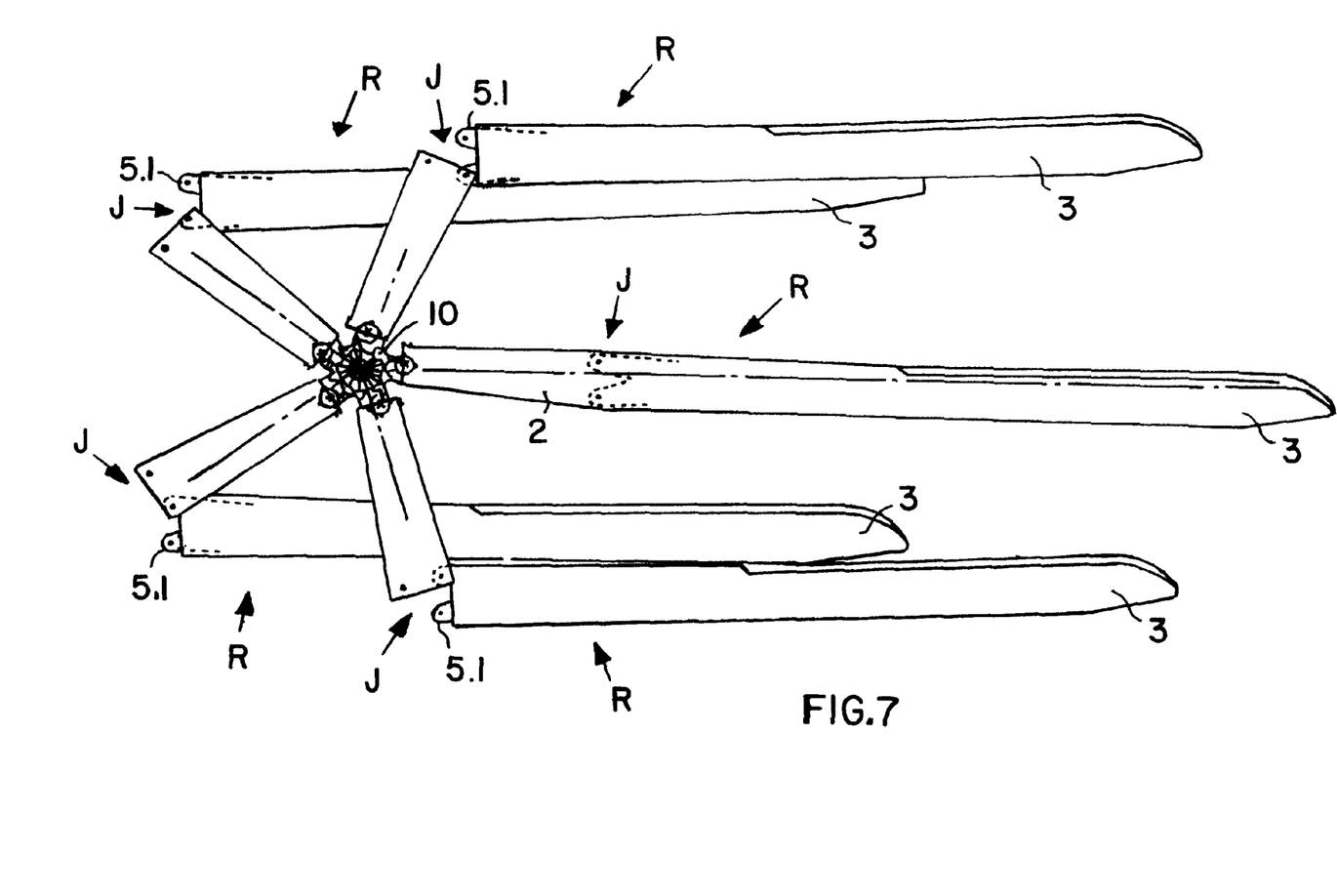
FIG. 7 is a schematic top plan view of a five-bladed rotor arrangement in a folded configuration, whereby four of the blades have been folded at the junctions according to the invention.

FIG. 7 shows a top plan view of a five-bladed rotor in a fully folded configuration, in which all of the lift-generating airfoil blades 3 extend in the same direction. Four of the five airfoil blades 3 have been folded or pivoted about one remaining fastening bolt at each respective separable junction J after the other fastening bolt has been removed from the respective junction J. Particularly, the blades are folded back toward the tail of the helicopter to provide a more compact storage and transportation configuration of the helicopter.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A rotor blade for a bearingless rotor of a helicopter, comprising:
    an airfoil blade having a tip end and a root end forming opposite ends thereof;
    a flexbeam including a flexbeam body and a flexbeam head at an end of said flexbeam body, and being flexible so as to allow lead-lag movements of said rotor blade in a lead-lag plane;
    a control sleeve enclosing and extending along at least a predominant portion of said flexbeam; and
    a separable junction arrangement providing a separable connection between said flexbeam head and said root end of said airfoil blade, wherein said junction arrangement comprises two connection arms arranged lying in said lead-lag plane.

2. The rotor blade according to claim 1, wherein said connection arms are respectively interconnected mechanically between said flexbeam head and said root end of said airfoil blade.

3. The rotor blade according to claim 2, wherein said connection arms are integrally connected to and extend from said root end of said airfoil blade, and further comprising removable fasteners respectively removably connecting said connection arms with said flexbeam head.

4. The rotor blade according to claim 1, wherein said connection arms are arranged respectively laterally beside said flexbeam head, on two opposite sides of said flexbeam head in said lead-lag plane.

5. The rotor blade according to claim 4, wherein said connection arms extend at a V-shaped angle relative to each other in said lead-lag plane.

6. The rotor blade according to claim 1, wherein said junction arrangement further comprises a connecting fixture that receives and is separably connected to said connection arms.

7. The rotor blade according to claim 6, wherein said fixture consists of a metal.

8. The rotor blade according to claim 6, wherein said fixture consists of a fiber-reinforced composite material.

9. The rotor blade according to claim 6, wherein said fixture is separable from said flexbeam head, and further comprising removable fasteners connecting said fixture to said flexbeam head.

10. The rotor blade according to claim 6, wherein said fixture is permanently and integrally connected to said flexbeam head as an integral extension from said flexbeam head.

11. The rotor blade according to claim 6, wherein said fixture is integrally formed on an inner surface of an end of said control sleeve adjoining said junction arrangement.

12. The rotor blade according to claim 6, wherein said fixture is connected to an inner surface of an end of said control sleeve adjoining said junction arrangement.

13. The rotor blade according to claim 6, further comprising two removable fasteners that removably connect said fixture to said connection arms, wherein said fixture and said connection arms respectively have aligning holes in which said fasteners are received.

14. The rotor blade according to claim 6, wherein said fixture comprises an upper plate and a lower plate arranged vertically below said upper plate with a space therebetween, and wherein said flexbeam head and said connection arms are received between said upper and lower plates.

15. The rotor blade according to claim 14, wherein said fixture further comprises a connecting wall spanning said space between and interconnecting said upper and lower plates, and two shanks protruding from said connecting wall along said lead-lag plane in a direction opposite said upper and lower plates, and further comprising elastomeric damping elements arranged on said two shanks.

16. The rotor blade according to claim 1, further comprising removable fasteners removably connecting said connection arms with said flexbeam head, wherein said flexbeam body includes a torsionally soft region having a flexbeam width measured perpendicular to a lengthwise axis of said rotor blade and projected into said lead-lag plane, and wherein said removable fasteners are arranged with a lateral spacing therebetween in said lead-lag plane that corresponds to at least 1.3 times a maximum value of said flexbeam width.

17. The rotor blade according to claim 16, wherein said lateral spacing corresponds to at least 1.4 times said maximum value of said flexbeam width.

18. The rotor blade according to claim 16, wherein said lateral spacing corresponds to at least 1.5 times said maximum value of said flexbeam width.

19. The rotor blade according to claim 16, wherein said lateral spacing corresponds to at least 80% of a chord length of said airfoil blade adjacent said root end.

20. The rotor blade according to claim 1, further comprising a connecting fixture connected to said flexbeam head, and removable fasteners removably securing said fixture to said connection arms, wherein said fixture provides a mechanical force transmission from said connection arms to said flexbeam head along effective lines of force that are offset from a lengthwise axis of said rotor blade.

21. The rotor blade according to claim 20, comprising a total of exactly two of said removable fasteners removably securing said connection arms to said fixture, and wherein said junction arrangement is so configured and adapted that said airfoil blade can be pivoted relative to said flexbeam about a single first one of said fasteners after a single second one of said fasteners has been removed.

22. The rotor blade according to claim 1, wherein an end of said control sleeve adjoining said junction arrangement has a duckbill configuration with an upper sleeve extension portion and a lower sleeve extension portion with an open gap therebetween, and wherein said connection arms and said flexbeam head are received in said open gap.

* * * * *